Patented Oct. 29, 1940

2,219,433

UNITED STATES PATENT OFFICE 2,219,433

SPLINTERLESS GLASS

Werner Starck and Werner Heuer, Hofheim, Germany, assignors, by mesne assignments, to General Aniline & Film Corporation, New York, N. Y., a corporation of Delaware No Drawing. Application December 9, 1935, Serial No. 53,681. In Germany December 14, 1934

7 Claims. (Cl. 49—92)

The present invention relates to splinterless glass.

Various processes of preparing splinterless glass are known which consist in interposing a film consisting of a polymeric body as an intermediate layer between two or more sheets of glass. As polymeric bodies polyvinyl ester, polyacrylic acid ester and others as well as mixed polymerization products have been proposed. In comparison with the cellulose derivatives hitherto used for the preparation of splinterless glass these polymerization products have certain advantages which chiefly consist in their improved plasticity. The vibrations of the glass are damped thereby more rapidly than is the case with glasses the intermediate layers of which consist of cellulose. On the other hand the intermediate layers made of polymeric products have the drawback that when the splinterless glass is strongly cooled the layers tend to become brittle.

Attempts have been made to overcome this drawback by adding a large proportion of a softening agent to the polymeric body. These products, however, show a decreased resistance to heat, that is, at temperatures of 40° C. to 60° C. which may obtain on hot days, the mass is already too soft so that it no longer has sufficient nerve and in consequence thereof is not sufficiently resistant. It has been tried to remedy this inconvenience by using mixed polymerization products instead of simple polymerization products. By these mixed products the brittleness in the cold is greatly diminished; however, the uniform manufacture of these products is more difficult than that of ordinary polymerization products.

Now we have found that splinterless glass the splinterproofing layer of which consists of an ester of polyvinyl alcohol having a high molecular weight as it is prepared according to the process described in the French Patent No. 792,-963, is neither brittle in the cold nor sensitive to raised temperatures. These polymerization products are prepared by polymerizing the monomeric organic esters of vinyl alcohol in the presence of peroxides of aliphatic carboxylic acids having at least 4 carbon atoms in the molecule, for instance of peroxides of fatty acids of high molecular weight. Whereas the resistance to heat of the synthetic polymeric substances hitherto used in the art is unfavorably influenced by the addition of 20 per cent. and more of a softening agent in the case of the polymerization products prepared according to the process of the afore-named French Patent No. 792,963, 20 to 30 per cent. and even more of a softening agent may be added without depreciating the usefulness of the product as an intermediate layer for splinterless glass which is to have an excellent resistance to cold and at the same time an entirely adequate resistance to heat.

As softening agents there may, for instance, be used the known phenol esters and alkyl esters of phosphoric acid, such as tributylphosphate, various phthalic acid esters, such as dibutylphthalate and diisobutylphthalate and other esters of high-boiling point known as softening agents, furthermore camphor, castor oil and the condensation products of ether-dicarboxylic acids with polyhydric alcohols described in the British Patent No. 447,131.

The polyacrylic esters of a relatively low degree of polymerization cannot be used for the preparation of splinterless glass; only those of a very high degree of polymerization are suitable, and even they show some drawbacks. On the other hand, the hitherto known polyvinyl esters of a relatively low degree of polymerization are fairly unsuitable. The properties required in an intermediate layer of splinterless glass have been so increased in the late years that there no longer exists a product which fulfills all the requirements. The main requirement is the maintenance of the most important properties of the intermediate layer, i. e. elasticity and resistance, within as large a range of temperature as possible. This range lies between the maximum and minimum temperatures occurring in a normal climate, i. e. between about +50° C. and about —20° C. This requirement is fulfilled for the first time by the polyvinyl-esters obtainable according to the process described in French Patent No. 792,963.

The splinterless glass may be composed of two layers of glass and one intermediate layer, or of several layers of glass and several intermediate layers. As intermediate layers there may be used the products obtainable by polymerizing in the presence of the peroxides mentioned above organic vinyl esters with organic unsaturated compounds known to yield mixed polymerization compounds.

The following examples serve to illustrate the invention, but they are not intended to limit it thereto, the parts being by weight:

(1) One surface each of two plane parallel glass plates is coated with the layer of a solution of a very highly polymeric polyvinyl acetate in ethyl acetate which contans 20 per cent. of a softening agent (phthalic acid dibutyl ester) calculated upon the solid resin. The polyvinyl acetate is obtained according to Example 1 of French Patent No. 792,963. The quantity of the solution applied is calculated in such a manner that after its evaporation a film of a thickness of 0.5 mm. remains on each glass plate. The plates are then superposed with the coated sides adjoining and pressed in known manner with application of heat and slowly increasing pressure. The two layers become homogeneous more quickly if each is coated with a softening agent.

After the plates have been pasted together homogeneously and free from bubbles, there is obtained a splinterless glass which within a range of temperature from +50° C. to −20° C. maintains its properties of resistance to splintering, i. e. on the one hand high resistance to fracture by shocks and on the other hand the property of yielding, when broken, fragments of glass which remain tightly connected with each other.

If, instead of the polyvinyl acetate, a mixed polymerization product from vinyl acetate and vinyl butyrate prepared according to the same polymerization method is used, a like degree of resistance to splintering is obtained without the addition of a softening agent.

(2) A mixture of 800 parts of highly viscous polyvinyl acetate prepared according to Example 1 of French Patent No. 792,963, and 200 parts of dibutyl phthalate is treated in a press used in the manufacture of Celluloid so as to form a block. Films having a thickness of 1.5 mm. are cut from this block. These films are pressed under a pressure of 5 kilogrammes per square centimeter at a temperature of 80° C. and under a reduced pressure, between two layers of glass, while using a suitable adhesive substance, for instance by coating the glass with a thin layer of a polyvinyl acetate of a low viscosity.

A splinterless glass thus prepared shows within a large range of temperature a very high resistance to breaking.

(3) A foil of a thickness of 1.5 mm. of a mass obtainable according to French Patent No. 792,963 by polymerizing vinyl acetate to which 15 per cent. of dibutyl phthalate and 0.1 per cent. of dioleyl peroxide have been added is pressed with application of heat and pressure between two plates of glass, if necessary while simultaneously using an adhesive substance. There is obtained a splinterless glass which within a large range of temperature shows a very great resistance to breaking.

(4) A mass as it is obtained according to French Patent No. 792,963 by polymerization of 750 parts of vinyl acetate, 250 parts of acrylic acid ethyl ester in the presence of one part of distearyl peroxide is treated so as to obtain foils having a thickness of 1.2 to 1.5 mm. These foils are pressed in the usual manner between plates of glass. The splinterless glass thus obtained likewise shows a great resistance to breaking within a wide range of temperature.

We claim:

1. A splinterless glass comprising a plurality of glass sheets and an intermediate layer comprising a product obtainable by polymerizing vinyl esters of organic acids in the presence of peroxides of fatty acids of high molecular weight.

2. A splinterless glass comprising a plurality of glass sheets and an intermediate layer comprising a product obtainable by polymerizing vinyl esters of organic acids with organic unsaturated compounds known to yield mixed polymerization compounds with vinyl esters and effecting the polymerization in the presence of peroxides of fatty acids of high molecular weight.

3. A splinterless glass comprising a plurality of glass sheets and an intermediate layer comprising a softening agent and a product obtainable by polymerizing vinyl esters of organic acids in the presence of peroxides of fatty acids of high molecular weight.

4. A splinterless glass comprising a plurality of glass sheets and an intermediate layer comprising a softening agent and a product obtainable by polymerizing vinyl esters of organic acids with organic unsaturated compounds known to yield mixed polymerization compounds with vinyl esters and effecting the polymerization in the presence of peroxides of fatty acids of high molecular weight.

5. A splinterless glass comprising two sheets of glass and an intermediate layer comprising dibutylphthalate and a product obtainable by polymerizing vinyl acetate in the presence of oleic acid peroxide.

6. A splinterleess glass comprising two sheets of glass and an intermediate layer comprising a product obtainable by polymerizing vinyl acetate in the presence of oleic acid peroxide and dibutyl phthalate.

7. A splinterless glass comprising two sheets of glass and an intermediate layer comprising a product obtainable by polymerizing a mixture of vinyl acetate and acrylic acid ethyl ester in the presence of stearic acid peroxide.

WERNER STARCK.
WERNER HEUER.